United States Patent [19]
Weber

[11] 3,918,355
[45] *Nov. 11, 1975

[54] INFUSION APPARATUS AND METHOD
[76] Inventor: Robert L. Weber, 49 Clapboard Hill Road, New Canaan, Conn. 06840
[ * ] Notice: The portion of the term of this patent subsequent to Apr. 16, 1991, has been disclaimed.
[22] Filed: Mar. 4, 1974
[21] Appl. No.: 482,639

Related U.S. Application Data
[63] Continuation-in-part of Ser. No. 283,562, Aug. 24, 1972, Pat. No. 3,804,635.

[52] U.S. Cl. ............... 99/283; 99/302; 222/146 HE; 222/386
[51] Int. Cl.² ......................................... A47J 31/34
[58] Field of Search ...................... 99/302, 281–282, 99/283, 292–293, 294, 297, 299; 222/146, 319, 386

[56] References Cited
UNITED STATES PATENTS
2,529,395  11/1950  Hummel ........................... 99/302-P
2,661,126  12/1953  Spencer ............................. 222/386
3,754,462   8/1973  Brill ................................. 99/302-P-X Primary Examiner—Harvey C. Hornsby
Assistant Examiner—Arthur O. Henderson
Attorney, Agent, or Firm—Cooper, Dunham, Clark, Griffin & Moran

[57] ABSTRACT

An apparatus for the preparation of an infusion of coffee or the like includes a first chamber in which a liquid is heated to a predetermined temperature. A material to be infused with the liquid is contained in a second chamber which is in fluid communication with the first chamber through a passage extending above the liquid level in the first chamber. A weight dimensioned to fit closely inside the first chamber is latched in position above the liquid surface. When the liquid has been heated to the predetermined temperature, the weight is released and descends through the first chamber, trapping air underneath it. The weight forces the hot liquid under substantially constant pressure from the first chamber through the passage into the second chamber to form the infusion therein. The trapped air is then forced through the material to remove any remaining excess liquid. Means is provided for compensating for variations in the ambient temperature, as it may affect repeated operations of the apparatus. A restriction is provided for controlling the rate of flow. In one embodiment, at the inlet to the second chamber, a bimetallic disc valve is positioned for controlling the rate of flow of the hot liquid into the second chamber, for allowing initial flooding of the infusion chamber, and for preventing "channelling" of the liquid directly through the material to be infused. In a second embodiment, the outlet from the second chamber is restricted.

5 Claims, 18 Drawing Figures

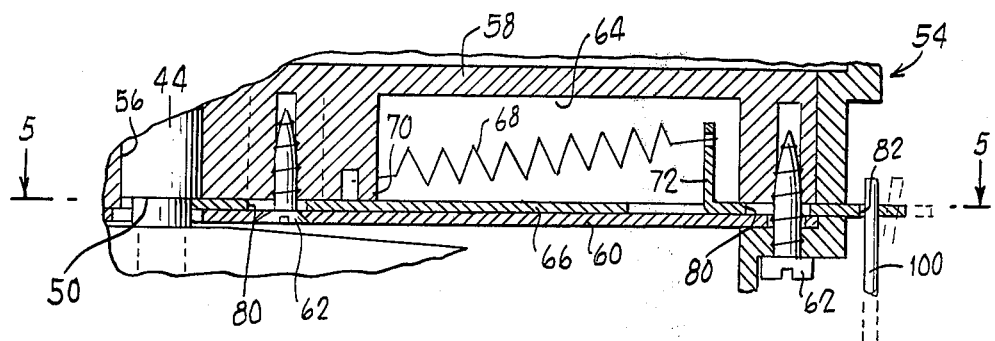
Fig. 4.
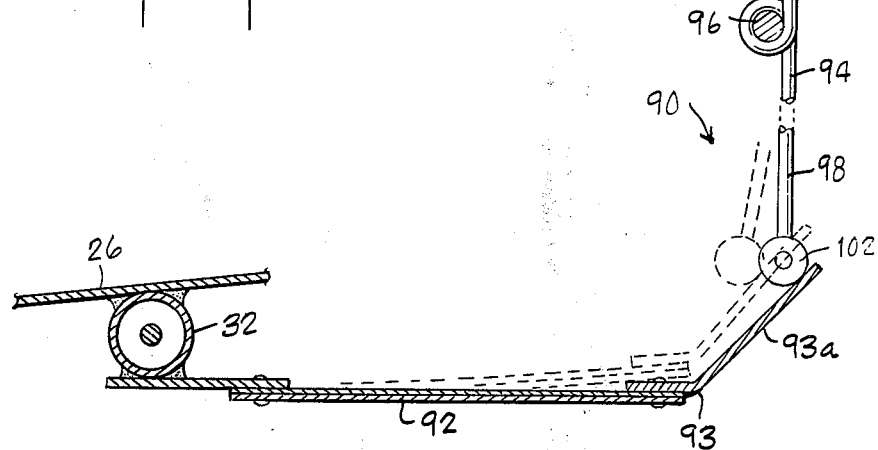
Fig. 5.
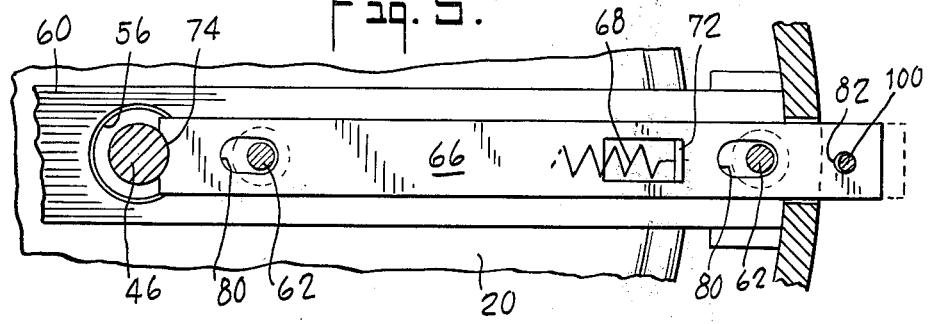
Fig. 7.
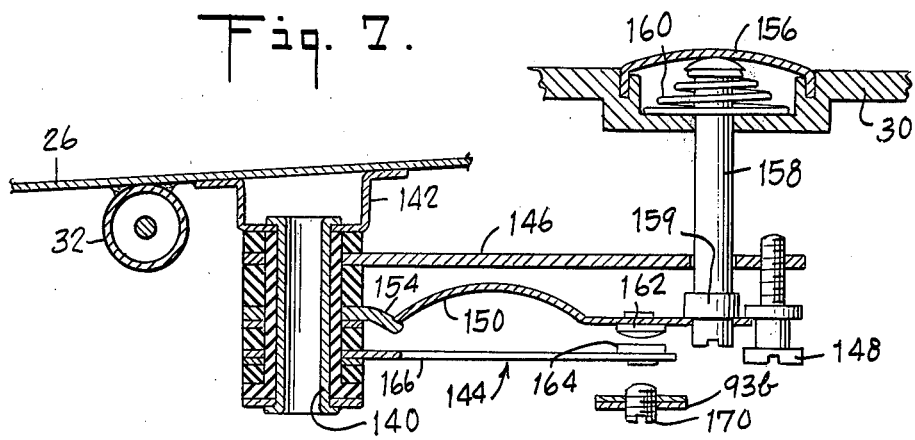

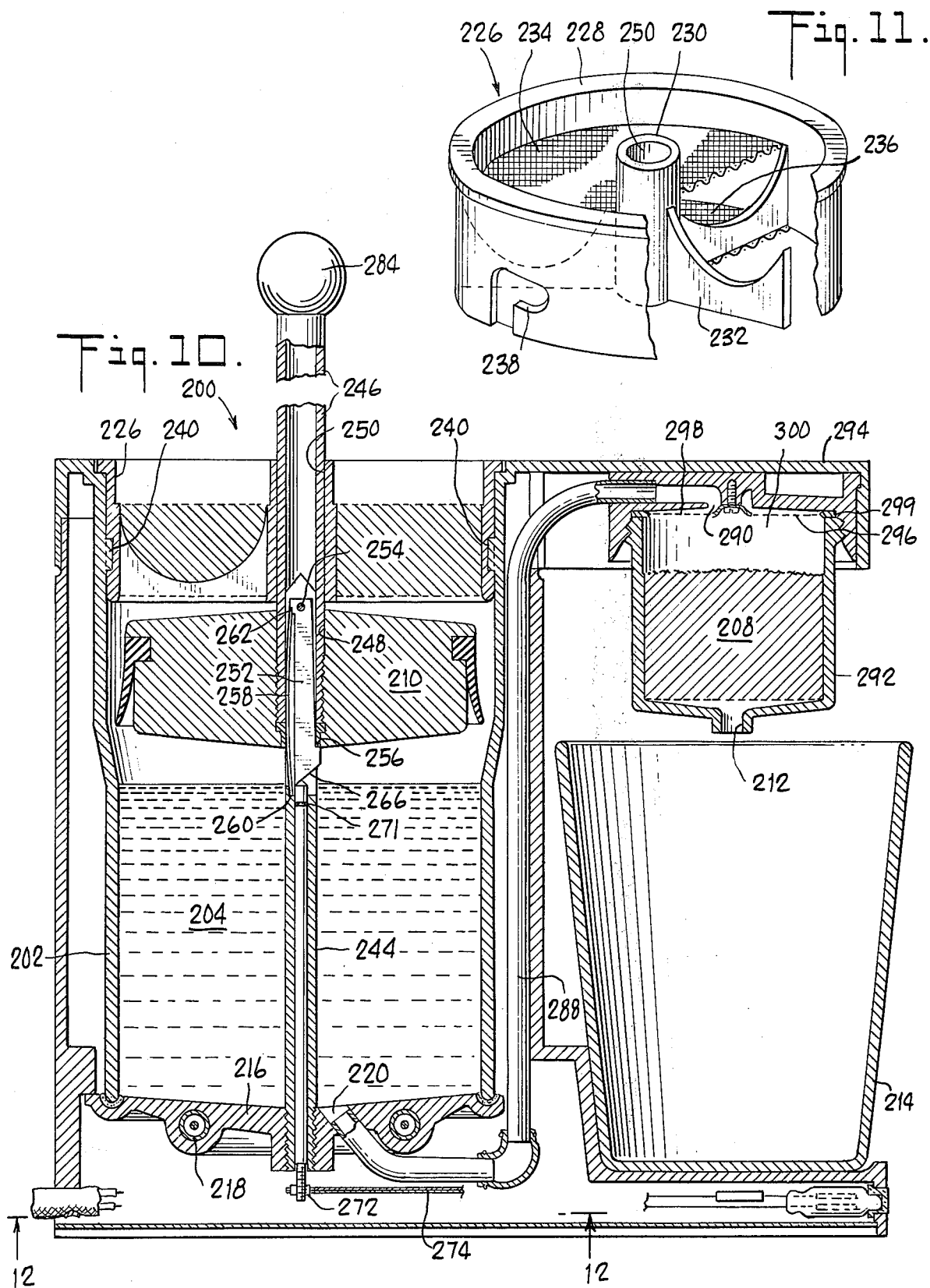

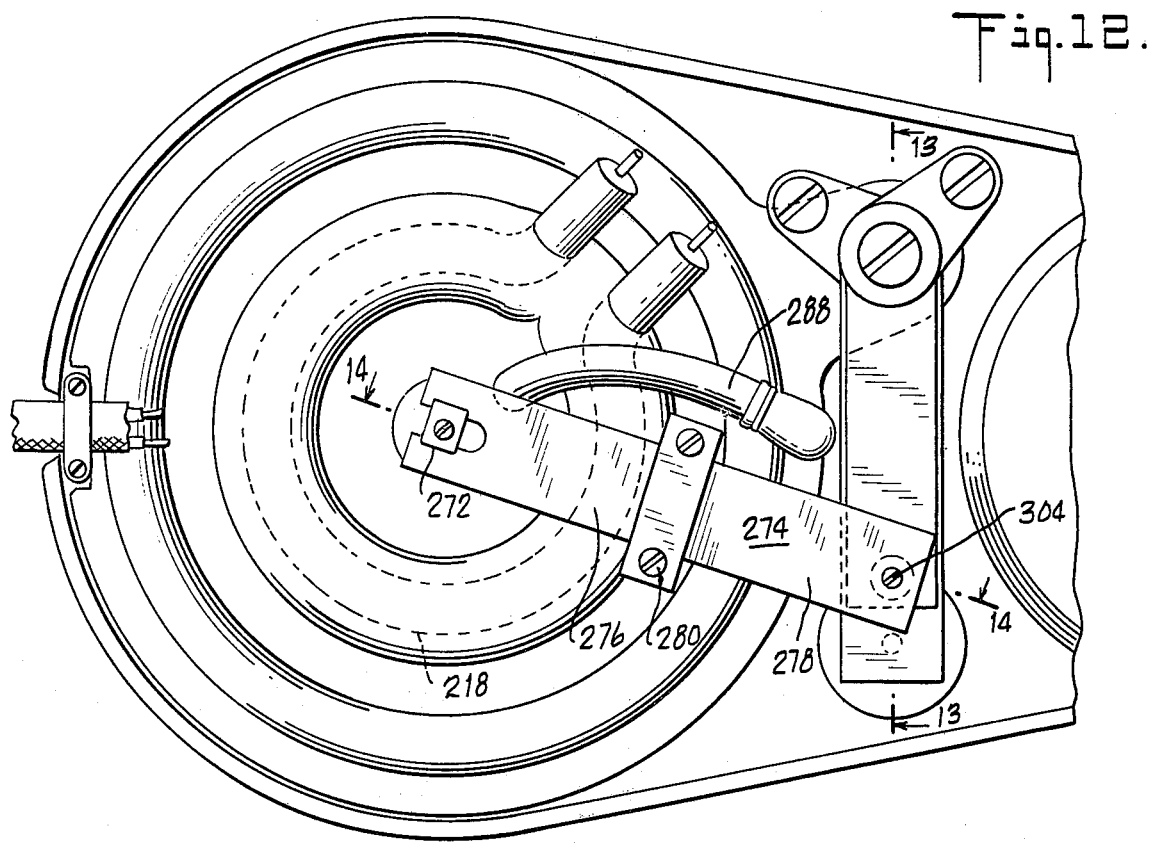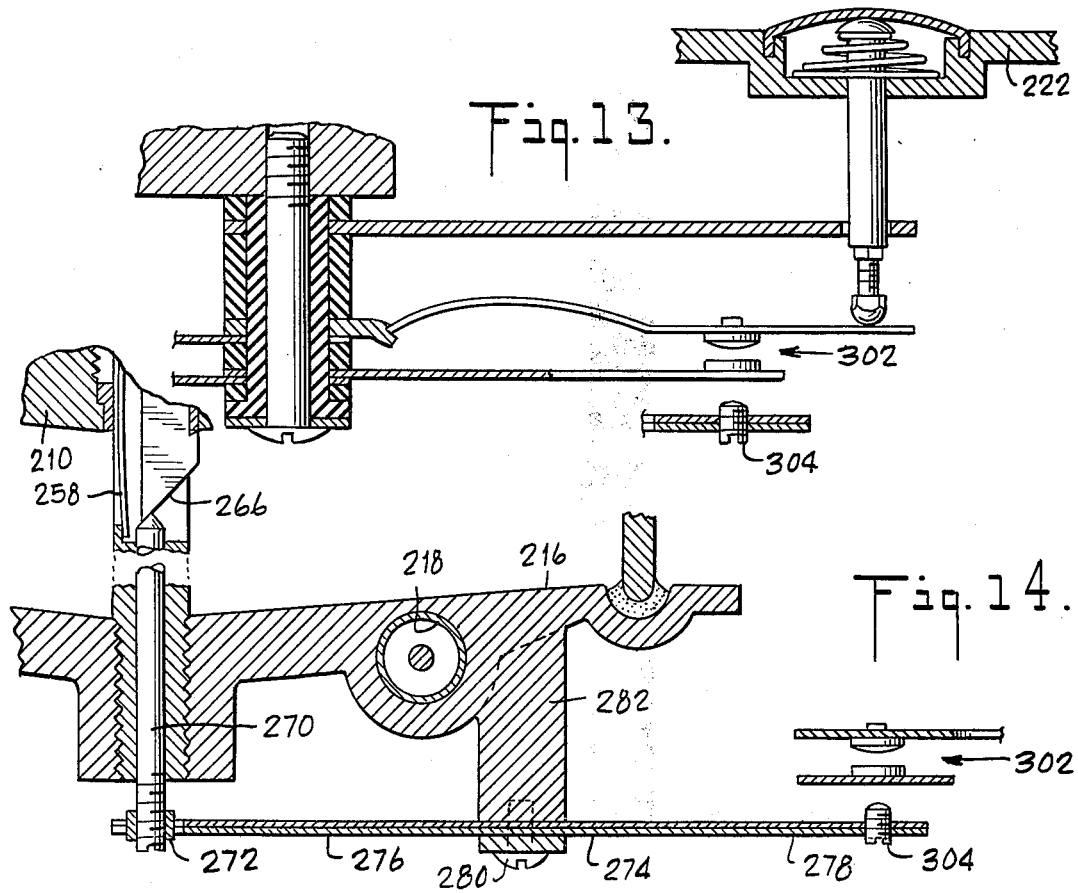

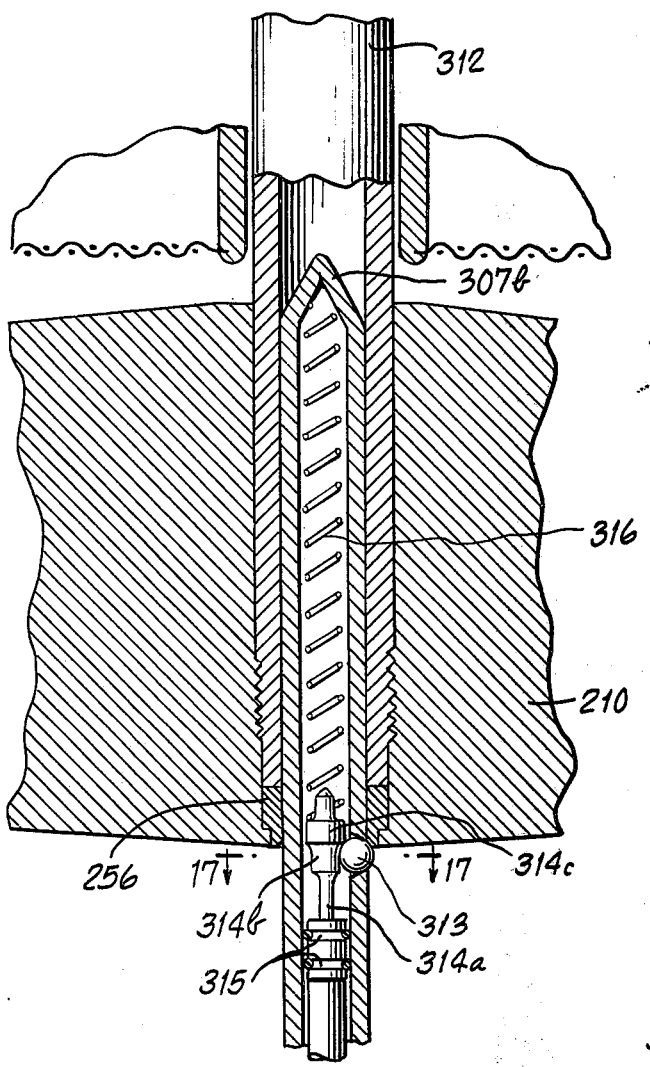
Fig. 16.
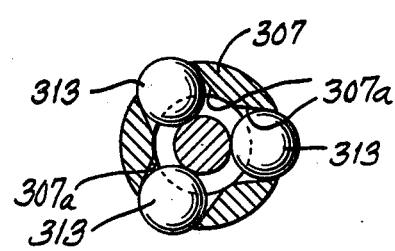
Fig. 17.
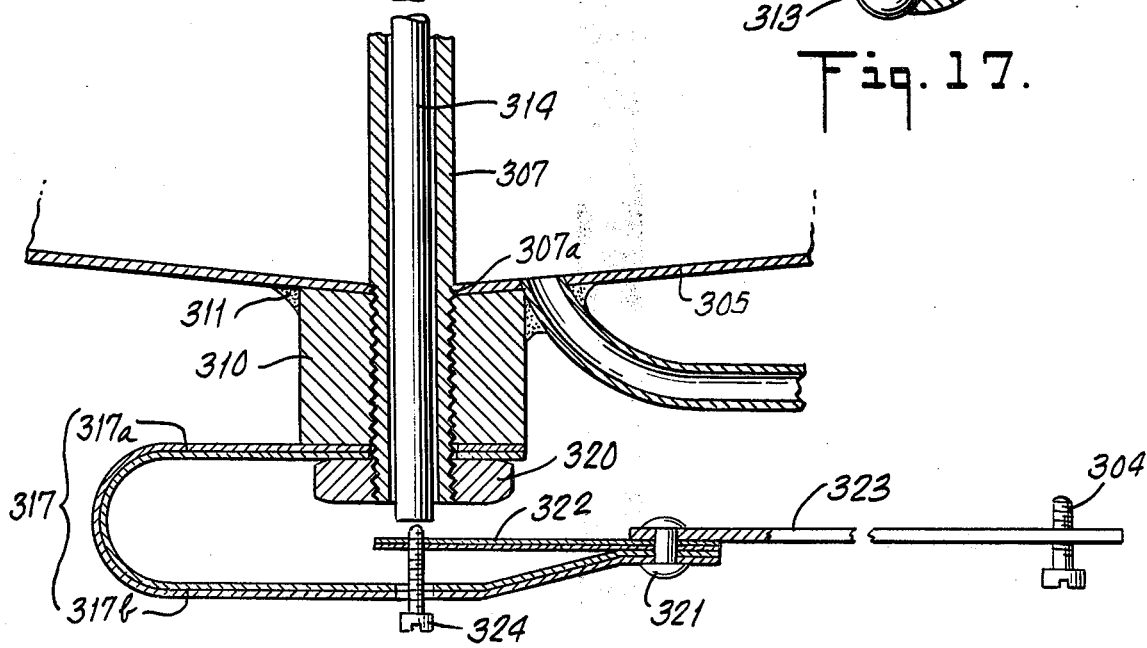

INFUSION APPARATUS AND METHOD

CROSS-REFERENCE

The present application is a continuation-in-part of Application Ser. No. 283,562 filed Aug. 24, 1972, now U.S. Pat. No. 3,804,635, issued Apr. 16, 1974.

BACKGROUND OF THE INVENTION

The present invention relates to an infusor for the preparation of coffee, tea, cocoa or the like in which the temperature of the water, the pressure of the water and the time of contact between the hot water and the ground coffee are properly controlled. The invention is particularly adpated for a fixed batch coffee maker, e.g., a single cup coffee maker.

In coffee infusors heretofore known in the art, an infusion is typically made by forcing water, either after it has been heated in a chamber or after it has been forced from the chamber and flash heated, through a pipe into contact with ground coffee contained in an infusion chamber. Devices of this type have not previously found universal application because of the lack of control over the critical parameters, i.e., temperature, pressure and time of contact. These are the most important variables which affect the flavor and quality of coffee.

Although typically the water is forced into the infusion chamber by vapor pressure of steam, it is known to move the water by a piston. For example, French Pat. No. 899,997, discloses an apparatus in which a piston is moved upwardly by hand to fill a cylinder with cold water. the piston is connected to a gas valve which is opened concurrently with the upward movement of the piston, which valve supplies gas to a burner to heat a flash tube coil. The piston is released at the top of the stroke, and is carried downwardly by a weight, forcing the water from the cylinder through the heated coil, and turning off the gas supply to the burner. The heated water is discharged into a basket containing ground coffee, to prepare an infusion. However, in this device, the heat supply is not controlled in response to water temperature, but is more or less haphazard. The heat supply depends on the upward speed of movement of the cylinder filling stroke, and on the downward movement during the discharge stroke. Furthermore, there is no control over the time of contact between the water and the coffee.

In another device shown in U.S. Pat. No. 1,552,565, the water is heated to a desired temperature in a cylinder. A plunger having at its upper end a weighted knob and at its lower end a container or basket for ground coffee is located in the cylinder. The weight of the knob causes the plunger to fall by its own weight within the cylinder. The weight-actuated plunger is not provided for the purpose of dispensing hot water from the heating chamber to a separate infusion chamber. Indeed, the plunger and the basket are intended to be reciprocated by the user within the cylinder by lifting the knob and then releasing it. It would not seem that the apparatus would not consistently produce coffee of good quality because of the continuous exposure of the ground coffee to the hot water and the lack of control over the rate of flow, pressure and temperature of the water.

The present invention is an improvement upon the inventions disclosed and claimed in my copending applications, Ser. No. 200,300, filed Nov. 19, 1971, now U.S. Pat. No. 3,793,933, issued Feb. 26,1974 entitled "Coffee Infusion Apparatus and Method" and Ser. No. 218,119, filed Jan. 17, 1972, now U.S. Pat. No. 3,844,206, issued Oct. 29, 1974 entitled "Infusion Apparatus and Method of Operating Same."

BRIEF SUMMARY OF THE INVENTION

The apparatus disclosed includes a first chamber for containing a liquid to be heated and a second chamber containing coffee or other material into which the heated liquid flows to produce the infusion. A passage connecting the chambers extends above the level of the liquid in the first chamber, so that no flow from the first chamber to the second takes place until the first chamber is pressurized. The heated liquid passes from the frist chamber to the second chamber under substantially constant pressure during a predetermined time period after it has been heated to a predetermined temperature.

The first chamber, which contains the liquid to be heated, is open to the atmosphere at its upper end to permit the chamber to be readily filled with water. This chamber remains open during heating of the water to prevent the formation of steam or the accumulation of vapor pressure upon heating. A heater is located adjacent to the bottom of the chamber to heat the liquid to a predetermined temperature, i.e. 195° ±5° F, which is the optimum water temperature for brewing coffee, according to the Coffee Brewing Center of the Pan American Coffee Bureau.

Within the first chamber is a weight movable from an upper position above the surface of the liquid contained in the chamber to a lower position at the bottom of the chamber. The weight is held in its upper position by a latch controlled by a thermostat. The latch disengages the weight after the liquid is heated to a temperature determined by the thermostat. The weight is of sufficient mass so that it descends by gravity from the upper position to the lower position, forcing the liquid under substantially constant pressure through the passage into the second chamber. The weight fits the walls of the chamber loosely, and carries a peripheral seal which closes the open top of the chamber so that the heated liquid is forced by the weight through an outlet at the bottom of the chamber. Means are connectable with the weight to increase the mass of the weight, as may be required to maintain a constant infusion time, if the volume of liquid is increased. This, the optimum pressure in the chamber can be produced by choosing the correct weight for the amount of liquid to be dispensed.

The second chamber contains the material to be infused such as coffee. The second chamber may also contain a water filter positioned above the material to be infused. As the liquid is forced by the falling weight from the first chamber into the second chamber, it passes a restriction which is desirably adjustable to control the rate of flow of the heated liquid. This allows flow rate adjustment for various quantities to be brewed. The liquid subsequently impinges against a second valve adjacent the inlet to the second chamber and in the path of flow. The second valve may comprise a bimetallic disc which moves to restrict increasingly the liquid flow as the heated liquid impinges against it and thus allows an initial flow at a high rate to flood the second chamber, followed by a reduced rate of flow. This valve also spreads the flow and thereby prevents "channelling" of the liquid through the material to be infused. The two valves insure that the liquid passes through the material to be infused in the second chamber in about three minutes, which is the optimum period of contact.

An air space is defined between the second valve and the material to be infused. This air space allows for swelling of the material and equalizes pressure on the surface of a pool of liquid which forms upon flooding of the chamber. The liquid is then forced evenly through the material. After the liquid flows through the material to be infused, a quantity of compressed air which has been trapped between the descending weight and the infusing liquid in the fist chamber combines with the air in the space between the second valve and the material. The combined air is forced through the material to flush out any remaining liquid.

Preferably, the infusion which is produced in the second chamber is discharged into an insulated receptacle positioned within a recess in the apparatus.

The thermostat is mounted on the heater, and responds to the heater temperature. In a modification, the thermostat is provided with compensating means to correct for variations in ambient temperature, such as may be encountered when the apparatus is operated quickly through more than one cycle.

In another modification, a water filter is located at the inlet to the frist chamber so that the liquid is filtered prior to heating. In lieu of the bimetallic disc, the flow rate is controlled by restricting the outlet from the second chamber.

BRIEF DESCRIPTION OF THE DRAWINGS

FIG. 4 is a fragmentary cross-sectional elevational view, showing one form of means for holding the weight in its upper position, taken along the line 4—4 in FIG. 3;

FIG. 5 is a partial plan view of the holding means taken along the line 5—5 in FIG. 4;

FIG. 7 is a cross-sectional elevational view of the controls for the apparatus taken along the line 7—7 in FIG. 3;

FIG. 10 is a cross-sectional elevational view of another form of apparatus;

FIG. 11 is a perspective view of a filter partly broken away, for use in the apparatus of FIG. 10;

FIG. 12 is a partial bottom view of the apparatus shown in FIG. 10, with a bottom cover removed, taken along the line 12—12 in FIG. 10;

FIG. 13 is a cross-sectional elevational view of the controls for the apparatus shown in FIG. 10 taken along the line 13—13 in FIG. 12; and FIG. 14 is a partial cross-sectional elevational view of the holding means of the apparatus shown in FIG. 10 taken along the line 14—14 in FIG. 12.

FIG. 16 is a cross-sectional view, on an enlarged scale, taken on line 16—16 of FIG. 15;

FIG. 17 is a fragmentary cross-sectional view taken on a line 17—17 of FIG. 16.

DETAILED DESCRIPTION

FIGS. 1 through 8

Figure 1:
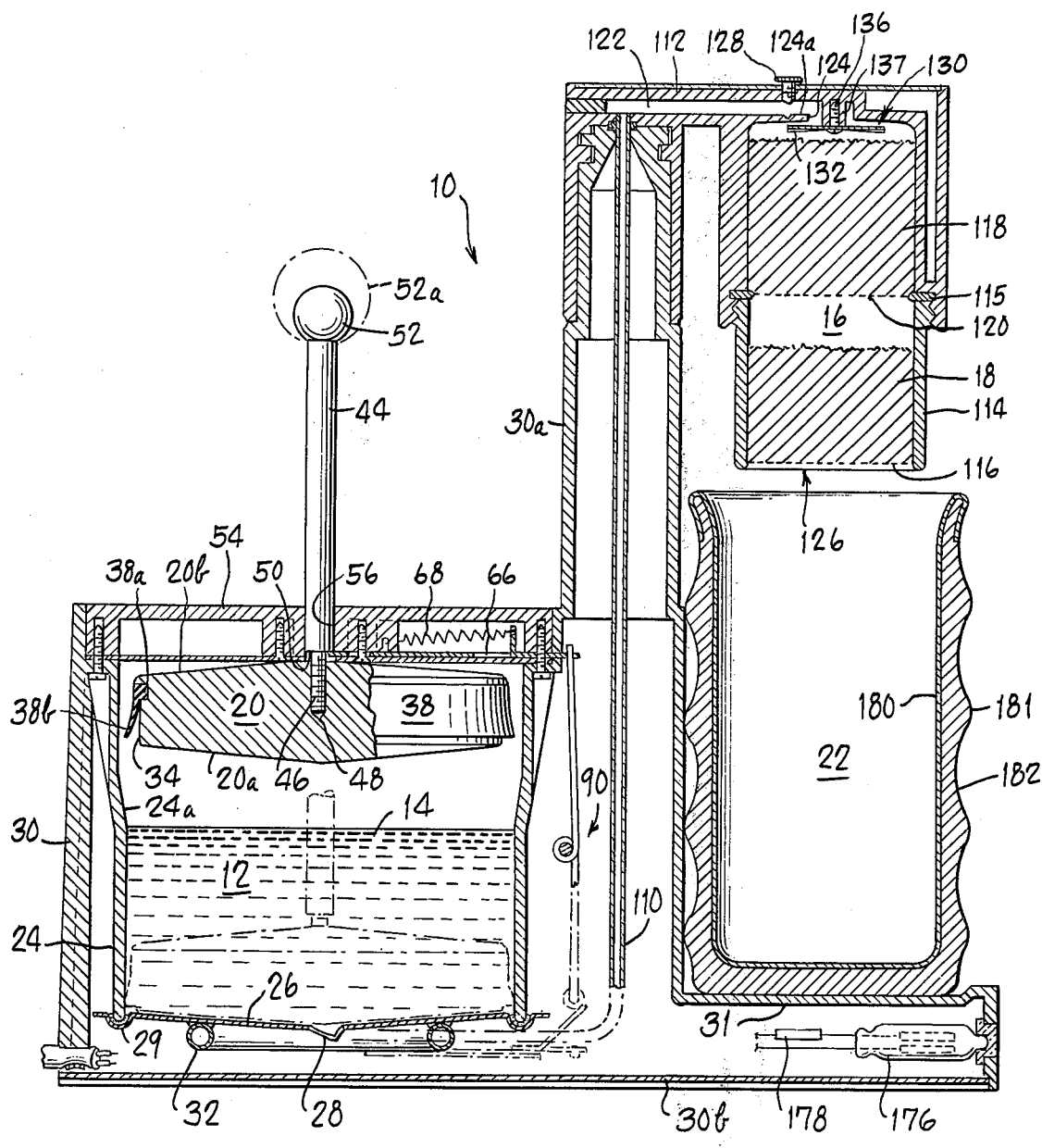
FIG. 1 is a cross-sectional elevational view of one form of apparatus in accordance with the present invention.
Figure 2:
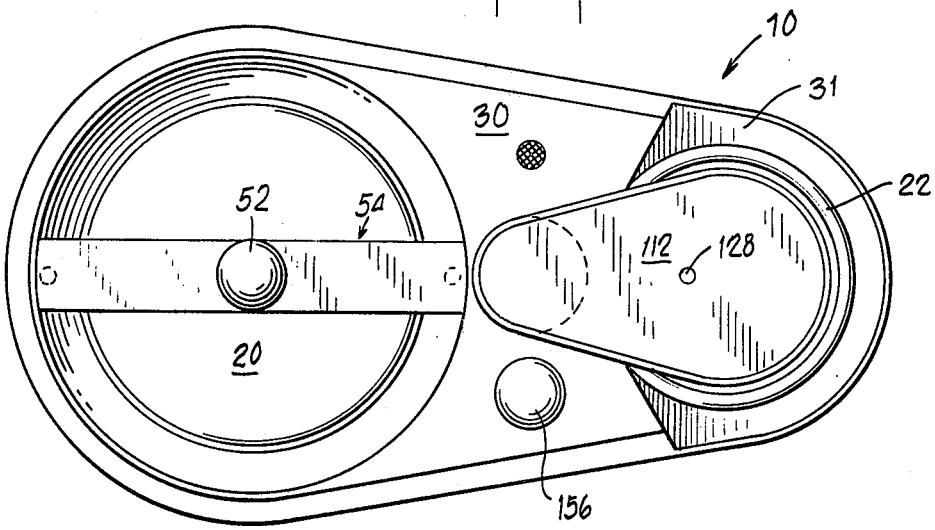
FIG. 2 is a top view of the apparatus shown in FIG. 1.

Referring to FIG. 1 of the drawings, there is shown apparatus 10 for the preparation of an infusion from a material to be infused, such as coffee, tea, cocoa or the like, which may be in ground, powdered or freeze-dried form. The apparatus 10 generally includes a heating chamber 12 in which a liquid, usually water 14, is to be heated, an infusion chamber 16 in which the infusive material, such as coffee 18, is contained, and a weighted piston 20 in the heating chamber for forcing the liquid 14 therefrom under substantially constant pressure into the second chamber 16 to form an infusion therein. A receptacle 22 is desirable to collect the infusion.

The heating chamber 12 is an open-mouth vessel made of plastic or like material with a smooth cylindrical interior wall 24 for easy cleaning. The interior wall 24 flares outwardly toward its upper end as shown at 24a, so that the internal diameter of the chamber is greater at its upper end than at its lower end. The bottom 26 of the chamber is an inverted metal cone with its nadir at the center so that the liquid readily flows out of the chamber through a centrally located outlet 28. It is preferred tha the bottom 26 be a separate element from the wall 24, in which case it is fastened to the lower edge of the wall and an annular seal 29 is provided at the joint.

A housing 30, preferably made of a heat resistant, attractively colored, unbreakable plastic material, encloses the chamber 12 and the weighted piston 20 and provides a seat 31 for the receptacle 22. A bottom 30b is provided for the housing. This housing not only provides a pleasing appearance, but insulates the chamber 12 and the heated liquid 14 therein.

Figure 3:
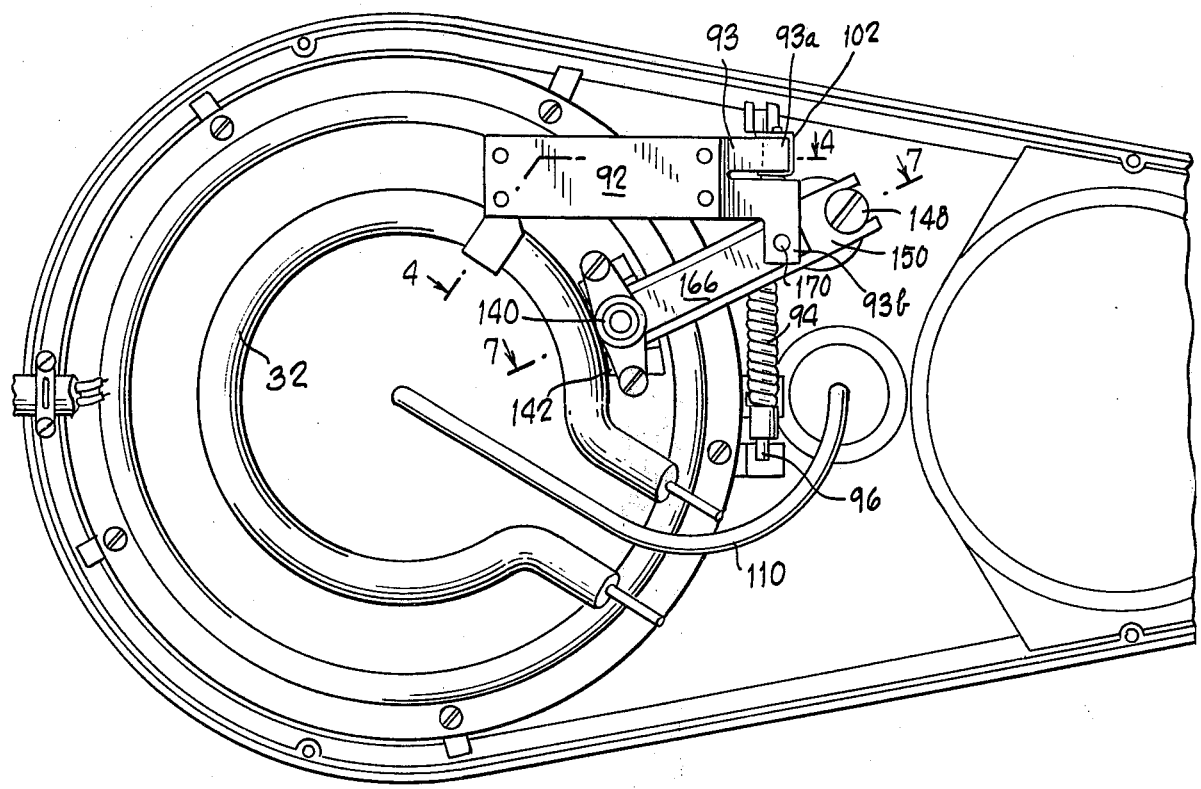
FIG. 3 is a partial bottom view of the apparatus shown in FIG. 1, with a bottom cover removed.
Figure 8:
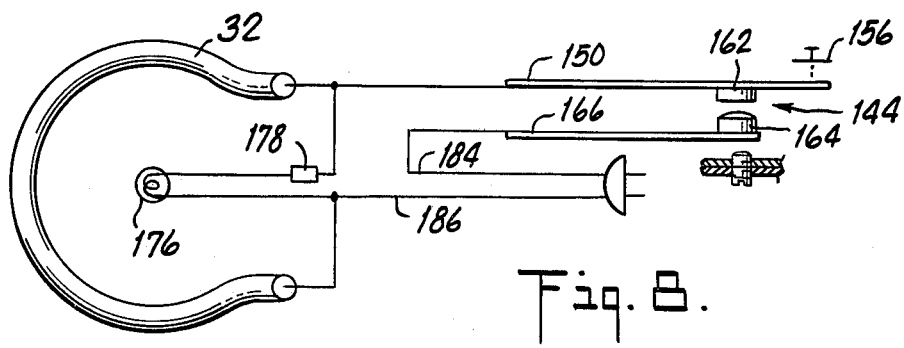
FIG. 8 is a circuit diagram of the controls for the apparatus shown in FIG. 7.

Located in the base of the housing 30 in heat conducting relation with the bottom 26 of the chamber 12 is a resistance heater 32 for heating the infusing liquid 14. The heater 32 is nearly circular in configuration and depends from the bottom 26. The construction of the heater 32 and the controls for operating it are best seen in FIGS. 3, 7 and 8, and the controls will be described in more detail below.

The weighted piston 20 for dispensing the infusing liquid 14 from the first chamber 12 is shown in its upper position in solid lines in FIG. 1. The weighted piston 20 is formed of stainless steel or similar high density, sanitary material and is of sufficient mass to force the liquid from the chamber solely under the influence of gravity. It is generally cylindrical in shape and has a vertical exterior wall 34 with a diameter somewhat less than the diameter of the interior wall 24 of the chamber at its flared upper portion 24a. However, the piston's diameter is only slightly less than the diameter of the interior wall 24 near the bottom of the chamber 12. The bottom 20a of the piston 20 has an inverted cone shape which cooperates with the inverted cone-shaped bottom 26 of the chamber to insure that all the liquid is forced from the chamber when the piston descends. The lower position of the piston 20 is shown in dot-dash lines in FIG. 1.

An annular peripheral seal 38 is attached to the piston's exterior wall 34 at the upper edge 38a of the seal, the lower circular edge 38b thereof protruding outwardly and downwardly from the exterior wall. The free edge 38b is sharp and flexible and the unstressed contour of the seal is such that it engages the interior wall 24 of the chamber 12 just above the point where the flared portion 24a tapers into the cylindrical portion, but does not engage the interior wall when the weight 20 is in its upper position. This permits vapor or steam to escape the chamber about the periphery of the piston when the liquid is being heated and the piston descends in the chamber so as not to dissipate the pressure created thereby.

Extending upwardly and outwardly from the top 20b of the weighted piston and through the open top of the housing 30 is rod 44 threadedly engaged at its lower end 46 in a hole 48 concentrically located in the top of the piston. The threaded portion 46 is of lesser diameter than the rod 44 so that a shoulder 50 is defined at their junction. At the upper end of the rod 44 there is threadedly engaged a knob 52 having a hole therein for receiving the rod. The knob 52 is made of high-density material and serves as an additional weight to increase the mass of the weighted piston 20 for forcing the liquid from the chamber 12. A knob 52 of appropriate size is employed, depending upon the quantity of infusing liquid 14 to be dispensed. The greater the volume of liquid, the greater the size of the knob used. A larger knob 52a (shown in dot-dash lines in FIG. 1) is used for an appropriately larger volume of infusing liquid 14. Of course, other means may be employed for increasing the weight of the piston so long as the means is calibrated anf of suitable proportions. It may also be desirable to add or subtract a weight to accommodate different grinds of coffee, as the size of the grounds will affect resistance to flow and hence the flow rate. The knob 52 has the further function of providing a ready handle for lifting the piston to restore it to its upper position.

Secured to the upper portion of the housing 30 is a bridge 54 for supporting the latch means for holding the pistion in its upper position. This bridge 54 has a centrally located aperture 56 through which the rod 44 of the weighted piston 20 extends. The bridge shown extends diametrically across the open top of the chamber 12 (FIG. 2) and is wide enough to provide support for the weighted piston and to define its uppermost position. Water may be poured into the heating chamber 12 through the open space on either side of the bridge. the bridge is formed by a channel 58 and a bottom plate 60 (see FIG. 4) secured to each other and to the housing 30 and the chamber 12 by screws 62. An interior cavity 64 is defined by the channel 58 and bottom plate 60.

As best seen in FIGS. 4 and 5, within the interior cavity 64 is a thin, flat latch 66 which is in face-to-face contact with and can slide upon the bottom plate 60. A coil spring 68, fastened at its opposite ends to a lug 70 extending downwardly from the top plate 48 and to a lug 72 extending upwardly from the latch 66, biases the latch toward the aperture 56 in the bridge 54. At the end of the latch adjacent the aperture, a semicircular notch 74 is formed in the latch. This notch engages the threaded portion 46 of the rod 44 and the top face of the latch engages the underside of the shoulder 50 of the rod 44 so as to support the weighted piston 20 in its upper position. The latch 66 has a pair of longitudinal slots 80 therein such that the screws 62 for securing the top and bottom plates of the bridge 54 extend through the latch and do not interfere with it as it moves into and out of contact with the rod 44. At the end of the latch opposite the notch 74, a small hole 82 is provided in the latch.

The latch 66 is operated by linkage 90 as shown in FIG. 4. The linkage 90 includes a bimetallic thermostatic strip 92 which is responsive to the heat produced by the heater 32 and thus to the temperature of the liquid 14. As the bimetallic strip is not directly exposed to the liquid, because of the electrolytic corrosive effects which could result from such direct exposure, there is a time lag between the liquid temperature in the heating chamber 12 and the temperature of the strip. The liquid temperature will usually be a few degrees higher than the temperature of the strip. Consequently, if the strip is set to move at about 195°F, the liquid temperature in the heating chamber will then be about 200°F. One end of the strip is secured in direct contact with the heater and the opposite end has a bifurcated extension arm 93 having upstanding fingers 93a and 93b (FIG. 3). This bimetallic strip 92 operates a torsion spring 94 (FIG. 3) which in turn controls the position of the latch 66. The torsion spring 94 is coiled about a fixed shaft 96 with the two ends of the spring 98, 100 left free. The lower free end 98 carries a roller 102 which is engagable by the fingers 93a. The upper free end 100 extends into and through the hole 82 in the end of the latch 66. As the free ends are flexible, the bimetallic strip 92 must apply a substantial force to the roller 102 before the torsion spring 94 will pivot about its shaft 96 and the free end 100 will move the latch 66. Small movement of the bimetallic strip will not trip the latch 66 but will only pre-load the torsion spring; the movement of the finger 93a must be to the position indicated by the dashed lines in FIG. 4. Until the heater 32 has heated the infusion liquid 14 to the predetermined temperature and the strip 92 has moved, the latch will not disengage the shoulder 50 of the weighted piston 20. Thus, the bimetallic strip 92 acts as a thermostat which is responsive to the temperature of the liquid being heated and trips the latch 66 when the liquid has reached a temperature of 195° F ± 5° F.

It should be appreciated that other forms of linkage 90 may be employed to disengage the latch 66 from the piston 20 when the bimetallic strip thermostat 92 determines that the liquid has been heated to the predetermined temperature. The linkage may also be arranged such that the weighted piston can be swung away from the heating chamber for easier filling and cleaning.

After the liquid 14 has been dispensed through the outlet 28 of the first chamber 12, it passes through a tube 110 into the second chamber 16. The tube 110 provides fluid communication between the chambers. The tube 110 extends upwardly within the housing 30 and an upward extension 30a thereof until it reaches a level substantially higher than the liquid level in the heating chamber.

As the infusion chamber 16 is positioned at a higher elevation than the heating chamber 12, the liquid in the chamber 12 will not seek it own level and thereupon exit the chamber either by a siphon action or by gravity, except for a small portion which flows into the lower portion of the tube 110 when chamber 12 is filled. Furthermore, here is no vapor pressure built up above the water surface during heating to force the water out of chamber 12. Hence, no valve structure is needed at the bottom of the chamber 12 to prevent outflow of the liquid before it is heated.

Located at the upper end of the tube 110 is an upper housing 112 which telescopes on the housing extension 30a and supports a coffee basket 114 in which the material to be infused, such as coffee 18, is contained. The housing 112 and the basket together define the infusion chamber 16. The coffee basket 114 threadedly engages the lower end of the housing 112 and is readily connectable with it. Leakage at the connection is prevented by an annular seal 115. A measured quantity of coffee 18 is placed in the basket 114 and is retained therein by a screen 116 at its lower end. Alternatively, a coffee cartridge such as that shown and described in my copending application, Ser. No. 218,119, filed Jan. 17, 1972, may be used.

Water filtering material 118 of an appropriate type and typically comprising activated carbon is located within a depending portion of the bridge and is held therein by a screen 120 at its lower end, the filtering material being positioned above the coffee basket. A passage 122 is defined in the bridge and extends between the upper end of the tube 110 and the inlet 124 adjacent the upper portion of the filtering material 118. Thus, the liquid dispensed passes through the tube 110, the passage 122, the inlet 124, the filtering material 118 and coffee basket 114. The liquid exits as an infusion through an outlet 126 at the bottom of the coffee basket 114.

A needle valve 128 which controls the rate of flow of the heated liquid is located within the passage 122. The needle valve may be in the form of a screw externally accessible so that it can be positioned by a screw driver.

Figure 6:
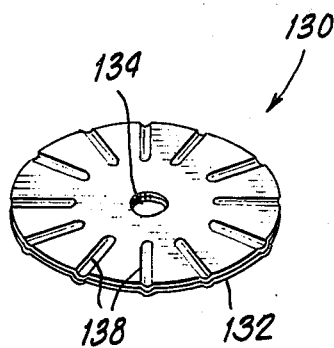
FIG. 6 is a perspective view of a valve for controlling the flow of liquid into the infusion chamber.

Positioned adjacent the inlet orifice 124 and downstream thereof in the path of flow of the heated liquid is a second valve 130. As best seen in FIGS. 1 and 6, this valve 130 comprises a bimetallic disc 132 having a central opening 134 through which a screw 136 extends to secure the disc to a downwardly extending post 137 on the housing 112. The valve 130 cooperates with needle valve 128 in controlling the rate of flow of heated liquid into the chamber 16. As the disc 132 has its axis concentric with the annular path of flow through the inlet, but has a larger cross-sectional area than the inlet and consequently than the flow of liquid, the liquid passing through the inlet must impinge against the disc. The heated liquid causes the bimetallic disc to flex upwardly against a seat 124a at the periphery of the inlet, thereby slowing the rate of flow therethrough. The disc 132 may operate with a snap action, in which case the rate of flow is initially rapid and suddenly drops to a slow rate, or it may operate with a slow action, in which case the drop to a slow rate takes place more gradually.

The valve 130 also prevents the formation of "channels" in the material to be infused 18 as the infusing liquid enters into the chamber 16. If the infusing liquid is permitted to flow in one or a few concentrated streams into the material, improper brewing may result as only that portion of the material adjacent the channel formed by the liquid will be brewed into an infusion. The valve 130 prevents this occurrence by spreading the liquid substantially about the entire upper surface of the filtering material 118. The bimetallic disc 132 has a plurality of grooves 138 formed in its upper surface and extending radially outwardly to the perimeter.

The grooves 138 insure that the flow of liquid is not entirely shut off when the valve is engaging its seat; there are always paths available for liquid flow. Furthermore, the grooves are evenly distributed about the periphery of the disc, so that the disc still performs its spreading function even when seated on the seat 124a. It is also contemplated that the disc 132 be provided with slots extending entirely through, rather than with the grooves 138.

In the arrangement shown, valves 128 and 130 cooperate in determining the rate of flow. Either valve 128 or valve 130 may be omitted, in which case the other valve acts alone in determining the rate of flow. If neither valve is used, the heated liquid will pass through the material to be infused too quickly, resulting in under extraction of the material.

In FIG. 7 there is shown the mechanism for controlling the cycle of operation of the apparatus 10 and in FIG. 8 there is shown a circuit diagram for the controls. In FIG. 7, a sleeve 140 is carried by a bracket 142 depending from the bottom 26 of the chamber 12. The sleeve supports a stack of insulators interspersed with terminals and other electrical elements including a two-position, snap-leaf master switch 144. The sleeve 140 carries an outwardly extending rigid plate 146 which threadedly carries at its tip a stop member 148. This stop member has two flanges between which moves the end of a switch leaf 150 pivoted at its opposite end at 154 and also supported by the sleeve 140. A push button 156 is mounted in the top of the housing 30. The button 156 is preferably of flexible material and acts downwardly on a push rod 158 of square crosssection. A round head nut 159 is threadedly fastened to the lower end of the rod 158, the nut extending through an aperture in the switch leaf 150. The nut 159 has a slotted head so that it can be adjusted in position in relation to the rod 158, thereby positioning the rod in relation to the switch leaf 150. A coil spring 160 is retained between the head of the push rod 158 and a shoulder on the housing 30. The spring 160 normally biases the rod 158 to an upward position in which the heater 32 is de-energized. Upon downward pressure being manually exerted upon the push button 156, the rod 158 moves downwardly against the force of the spring 160 against the leaf 150. The leaf 150 carries a contact 162 which cooperates with another contact 164 on a leaf 166, which is also supported by the sleeve 140. The leaf is constructed in a well-known manner to move between its upper position and its lower position with a snap action, and to remain in either position until moved at least part way towards its other position. When the leaf 150 reaches its lower position, contacts 162 and 164 engage, and the heater 32 is energized. As aforesaid, the bimetallic strip 92 has a finger 93b extending upwardly and outwardly from the end thereof opposite the end which is in heat conductive relationship with the heater 32 (FIG. 3). The finger 93b threadly supports an insulated positioning button 170 which is located under the end of the switch leaf 166. As the bimetallic strip 92 and the finger 93b thereof are raised upon the infusing liquid being heated to the predetermined temperature, the button 170 engages the contact 164, and moves it and contact 162 outwardly until leaf 150 snaps to its upper position, separating the contacts and de-energizing the heater 32.

Also mounted near the bottom 30b of the housing is a lamp 176 for indicating when the liquid is being heated. The lamp 176 is in series with a ballast resistance 178 (FIG. 8) and in parallel with the heater 32.

The receptacle 22 (FIG. 1) is positioned in the seat 31 beneath the outlet 126 of the coffee basket 114. Although the receptacle 22 does not form an integral part of the present invention, the receptacle shown in FIG. 1 is particularly desirable for use with the apparatus 10 in that it is of the proper dimensions to fit readily within the apparatus and to receive an infusion. The receptacle has a plastic lining 180 covered by a layer of plastic or rubber insulation 181 to protect the hands of the user so that the user can drink directly from the receptacle once the infusion has been prepared. Desirably also, the outer surface of the receptacle has horizontal grooves 182 so that it can be easily grasped and held. Of course, a standard glass cup or receptacle could also be used.

OPERATION

The operation of the infusion apparatus shown in FIGS. 1 through 8 will be described in connection with the operation of the electrical circuit shown in FIG. 8. In order to place the infusor in operation, a measured quantity of coffee 18 or the like is placed in the coffee basket 114 and the coffee basket is then threadly inserted into the depending portion of the housing 112 such that the infusion chamber 16 is defined. A measured quantity of cold water proportional to the quantity of coffee is poured into the heating chamber 12. Of course, if an amount of coffee used to make one cup is placed in the basket 114, one cup of cold water is placed in the chamber 12; if two cups of coffee are desired, a double portion of coffee is placed in the basket 114 and two cups of cold water are placed in the chamber 12. It is assumed that the water filtering material 118 is in location, although the filtering material 118 is not essential to the performance of the apparatus. After the water has been placed in the heating chamber, the push button 156 is depressed, whereupon the switch leaf 150 is moved over center by the pin 158 so that its tip end is biased toward and engages the lower flange of the stop member 148, thereby closing the contacts 162, 164. This completes a circuit from one power supply line 184 through contact 162 and 164 thence through the heater 32 and through the second power supply line 186, the lines 184, 186 comprising a power supply cable. As the lamp 176 is in parallel with the heater, it is lit when the heater is in operation.

The water in the heating chamber 12 starts to heat, and as it heats the vapor pressure does not increase as the vapor of steam passes about the annular peripheral seal 38 of the weighted piston 20 and is discharged into the atmosphere. After the water in the heating chamber reaches a temperature of about 195°F ± 5°F. the bimetallic thermostatic strip 92 is moved to its upper position. The finger 93b thereof and the button 170 therein forces the leaf 166 upwardly against the leaf 150 to cause the leaf 150 to snap back over center and against the upper flange of the stop member 148. This separates the contacts 162, 164 and opens the electrical circuit to the heater 32.

Concurrently, the other finger 93a of the bimetallic thermostatic strip 92 engages the roller 102 at the free end 98 of the torsion spring 94. The spring 94 pivots about its shaft 96 so that the opposite free end 100 of the spring biases the latch 66 against the force of the spring 68. This forces the latch to move in relation to the bottom plate 60 of the bridge 54 and to disengage from the shoulder 50 of the rod 44. After the latch moves only a slight distance, the rod 44 is released and the weighted position 20 attached thereto descends within the heating chamber 12.

Due to the mass of the weighted piston 20, pressure is exerted on the heated infusing liquid to force the liquid through the outlet 28, the tube 110 and the passage 122 into the upper portion of the chamber 16 under substantially constant pressure. This pressure is not dissipated past the edge of the piston because the seal 38 closes the chamber 12 as the piston falls therein. However, as the chamber is open prior to descent of the piston, vapor pressure does not accumulate and thereby interfere with control over the pressure by the mass of the weighted piston. The heated liquid passing through the inlet 124 passes the needle valve 128 and impinges against the bimetallic disc 132 of the valve 130. The valves 128 and 130 are adjusted so that substantially all the liquid passes through the coffee in the chamber 16 in about 3 minutes. The liquid is distributed throughout the upper surface of the filter cartride 118 and percolates therethrough and thence through the coffee 18 in the coffee basket 114 to form an infusion. As the heated liquid flows past the bimetallic disc valve 130, the valve partially closes so as to substantially slow the flow of liquid therethrough.

Descent of the weighted piston 20 within the chamber 12 causes an initial surge of liquid into the coffee basket. This floods the coffee basket and assists in preventing the formation of channels therein. Also, the liquid is dispersed over the surface of the coffee 18 in a pool and is also dispersed throughout the coffee basket to prevent the formation of channels.

As the seal 38 has sealed the heating chamber 12 from the atmosphere, a quantity of air is trapped between the bottom 10a of the weighted piston and the surface of the liquid in the chamber. This quantity of air is compressed by piston 20 and this compressed air passes into the coffee in the coffee basket after the liquid has been dispensed. The compressed air forces the water remaining in the coffee to drain out through the screen 116, leaving the coffee dry and fully extracted.

If, by accident, the push button 156 whould be actuated when no water is in the heating chamber 12, the heater 32 will quickly reach its predetermined maximum temperature. The bimetallic strip 92 (FIG. 3) will then move upwardly so that the button 170 (FIG. 7) of the finger 93b will separate the contacts 162 and 164 to open the circuit before any part of the infusion apparatus is damaged by excessive heat. Although the weighted piston 20 will concurrently be caused to fall within the chamber, it will cause no damage, since its fall will be cushioned by the air trapped under the piston. The piston is easily restored to its uppermost position by lifting the knob 52 until the latch 66 engages the shoulder 50, whereupon the piston is then locked in position. The latch 66 cannot be accidentally moved to release the piston.

When more than one cup of coffee is to be prepared such that two cups of water are placed in the chamber 12, the mass of the piston is adjusted so that sufficient pressure is placed on the liquid to increase the rate of flow so as to maintain the same brewing time. This may be accomplished by choosing a larger size knob 52a and threadedly connecting it to the upper end of the rod 44. Alternatively, an extra weight having a recess in its under side adapted to receive the knob 52a may be used.

As another alternative, the weight could remain constant and a variably restricted orifice could be provided on the bottom of the infusion chamber. This orifice would be opened to permit the desired flow rate.

FIGS. 10 through 14

In FIG. 10 there is shown another embodiment of the apparatus 10 shown in FIG. 1. Apparatus 200 is substantially similar to apparatus 10 and differs therefrom primarily in the use of different means for latching the weight in its upper position and in the position of the filter. The apparatus 200 generally comprises a first or heating chamber 202 in which liquid 204 to be heated is disposed, a second or infusion chamber 206 in which material to be infused, such as coffee 208, is located, and a weighted piston 210 of sufficient dimension and weight to fall under the influence of gravity within the first chamber 202 to force the heated liquid therefrom under substantially constant pressure into the second chamber 206 to thereby prepare an infusion. The infusion passes through a restricted outlet 212 at the bottom of the chamber 206 into a receiver 214, which may be a standard glass cup.

The first or heating chamber 202 is similar to the chamber 12 shown in FIG. 1. Its bottom 216 is of greater thickness, however, and a resistance heater 218 is disposed within a cavity in the bottom. An outlet 220 located at the bottom of the chamber 202 is slightly offset from the centerline for a reason which will become apparent, although it is at the lowest point of the chamber. The chamber 202 is contained within a housing 222 which has an aesthetically pleasing shape.

A particular feature of the embodiment of FIG. 10 is the provision of a water fliter 226 at the inlet to the chamber 202. This water filter 226 is best seen in the perspective view of FIG. 11. Unlike the embodiment of FIG. 1, where the filtering material 118 is provided adjacent to the infusion chamber to filter the liquid after it has been heated, the filter 226 of the modified embodiment of FIGS. 10 through 14 is positioned to filter the liquid prior to its being heated. The filter 226 includes an outer cylindrical shell 228 and a central hub 230, the hut 230 being connected to the shell 228 by ribs 232 extending radially outwardly from the hub. Preferably, three ribs located at 120° angles to each other are used to connect the hub and the shall. Each of the ribs is desirably dished so as to occupy a minimum of space within the interior of the shell 228. This maximizes the free flow of liquid through the filter while providing a rigid filter structure. A first screen 234 is located near the upper portion of the filter adjacent to the tops of the ribs 232 and a second screen 236 is located at the bottom of the filter 226 adjacent the bottoms of the ribs 232. A suitable filter material, such as activated carbon, is disposed between the screens, which hold the material in position. The shell 228 is supported in the housing 222 by a bayonet joint including two L-shaped notches 238 in the shell 228 and co-operating with corresponding lugs 240 on the housing 222. The filter 226 is positioned within the housing and the lugs 240 fit within the notches 238; upon slight rotation of the filter, the lugs lock within the notches and the filter is held firmly within the housing.

Holding means 242 for latching the weighted piston 210 in its upper position substantially differs from that shown in the first embodiment of the invention but accomplishes the same objective. The holding means 242 includes a fixed, hollow tube 244 centrally located in the chamber 202 and extending vertically upward from the bottom 216 thereof. The tube 244 terminates at its upper end within a second hollow tube 246 having an internal diameter slightly greater than the external diameter of the tube 244 so that the tube 246 telescopically fits about the tube 244 and is slidably movable thereon. The second tube 246 is threaded at its lower end and fits within a threaded aperture 248 centrally located in the weighted piston 210. Both the weighted piston 210 and the tube 246, which extends upwardly and outwardly from the upper surface thereof, can slide upon the first tube 244. The piston is maintained in proper alignment with the chamber by the tube 246, which is slidably within a central opening 250 in the hub 230 of the filter 226. This arrangement provides a guide for shaft 246 and holds the piston centrally within chamber 202.

Pivotally mounted at the upper end of the tube 244 and extending downwardly within that tube is a hardened, blade-like latch 252 pivoted as at 254 at its upper end. Near its lower end, the latch 252 is provided with an upwardly directed shoulder 256. A leaf spring 258 is disposed between a seat 260 in the wall of the tube 244 and a lug 262 at the upper end of the latch 252 adjacent the pivot 254. This leaf spring 258 normally biases the latch so that the shoulder 256 extends through an opening in the wall of the tube and engages the bottom of the weighted piston 210 adjacent the central aperture 248 at a hardened portion or insert 264 surrounding the central aperture. The latch 252 further has a bias cut portion 266 at the lower end.

A hardened push rod 270 is located within the fixed tube 244 and is slidably movable therein, being sealed against pressure leaks and moisture by an O-ring seal 271. The upper end of the push rod 270 is tapered at its upper end and engages the bias cut portion 266 at the lower end of the latch 252. As the push rod 270 is moved upwardly within the tube 244, its tapered upper end rides upwardly upon the bias cut portion 266 until the latch 252 is caused to pivot about the point 254 against the force of the spring 258 and weight of the piston to disengage the bottom of the weighted piston 210.

The push rod 270 is threaded at its lower end and is threadedly received within a nut 272 or other connector mounted at one end of a bimetallic thermostatic strip 274. As explained in conjunction with the embodiment shown in FIG. 1, when the thermostatic strip 274 determines that the liquid 204 in the first chamber 202 has been heated to a predetermined temperature by the heater 218, the thermostatic strip moves upwardly. This thermostatic element slowly forces the push rod 270 upwardly within the tube 244 to thereby pivot the latch 252 into disengagement from the weighted piston 210. The piston then descends within the chamber 202 to dispense the heated liquid therefrom. The strip 274 has two arms 276 and 278 and is fixed at its mid-point by a screw 280 to a post 282 extending downwardly from the bottom 216 of the chamber (FIG. 14).

At the upper end of the tube 246 there is mounted a knob 284 for increasing the mass of the weight, which may also be used for lifting the weight, and for closing the upper end of the tube 246. Also as in the embodiment of FIG. 1, an annular seal 286 is disposed about the periphery of the weighted piston 210 to seal the chamber 202 at its open upper end as the weight descends therein.

As the heated liquid is dispensed from the chamber 202 upon descent of the weighted piston 210 therein, the liquid passes through a tube 288. This tube extends from the outlet 220 of the chamber 202 and then upwardly within the housing 222 until the tube reaches a point above the upper level of the liquid 204 in the chamber. The tube then terminates at an inlet 290 into the infusion chamber 206. As there is no filter within the infusion chamber 206, the heated liquid passing through the inlet 290 directly contacts the material 208 to be infused within the infusion chamber.

A coffee basket 292 may comprise the infusion chamber 206, the basket being insertable in the upper portion 294 of the housing. A spreader plate 296 is positioned at the upper portion of the basket. This spreader plate 296 is a metal disc in the nature of a sieve having a plurality of small holes 298 therein for passage of liquid. However, the holes 298 are small enough to prevent the reverse passage of the material to be infused. A molded rubber ring 299 seals the plate periphery against leakage. This spreader plate distributes the liquid entering the second chamber over the upper surface of the material to be infused. A pool of hot liquid is immediately formed over the material as the liquid enters. The pool forms a liquid seal to prevent channelling of air through the material.

An air space 300 is defined between the spreader plate 296 and the upper surface of the pool of liquid over the material 208 to be infused. This air space 300, which should be about one-eighth inch to one-fourth inch in depth, has several important functions. First, it allows for expansion of the infused material as the material is wet by the infusing liquid. Second, it prevents the material 208 from contacting the lower surface of the spreader plate 296 upon expansion of the material. If the material contacts the plate, it sticks to the plate and closes the holes 298 therethrough. Third, the air space 300 equalizes pressure on the surface of the pool of liquid which forms in the second chamber 206. This pool is created upon descent of the weighted piston 210 within the first chamber 202, the piston forcing the liquid into the second chamber 206. This air space 300 is under superatmospheric pressure and distributes the liquid evenly under uniform pressure through the material 208 to be infused. Finally, the air under superatmospheric pressure in the space 300 blends with the air trapped beneath the descending weighted piston 210 and this combined air passes through the material 208 after all the liquid has been forced therethrough to purge the material, leaving the material dry and fully extracted.

The liquid passing through the spreader plate enters the material 208 to be infused and prepares an infusion which is discharged through the restricted outlet 212 at the bottom of the chamber into the receiver 214.

This restricted outlet 212 has an important function. It eliminates the necessity of relying on the material being infused for creating the proper back pressure for maintaining the liquid in contact with the material for the desired period of time. As the heated liquid passes through the material to be infused, the material swells and creates greater resistance to flow. This resistance varies with the grind size, dust content and type of material. In a one-cup coffee maker (FIG. 10), the outlet 212 is calibrated to present the maximum resistance to flow allowable within the pressure limits created by the weighted piston. In a multi-cup apparatus, on the other hand, the compensation necessary to obtain the proper flow rate is achieved by using weighted knobs 284 of different sizes, by using valves, such as valves 128 and 130 in FIG. 1, or by providing an adjustable diameter outlet. By restricting the flow rate through the material, the resistance caused by swelling of the material becomes less important, as does the type of material, grind size and dust content. The restriction prevents the liquid from rapidly flowing through the material in less than the desired 3 minute period. Instead, the restriction results in immediate flooding and saturation of the material. Any air which is present in the material is pushed through the outlet 212 by the liquid and does not interfere with creation of the desired back pressure. Proper extraction of the material is thus obtained.

Operation

The operation of the apparatus shown in FIGS. 10 through 14 can best be understood in conjunction with an explanation of the electrical controls shown in FIGS. 12 through 14. These controls operate very similarly to the controls shown in FIGS. 3, 7 and 8 of the first described embodiment. As the switch contacts 302 are brought into engagement in the same manner as that described in conjunction with FIG. 7, the heater 218 is energized to heat the liquid 204 in the first chamber 202. As the liquid reaches the predetermined temperature, arm 276 of the thermostatic strip 274 moves upwardly to force the push rod 270 upwardly within the fixed tube 244. Upward movement of the push rod 270 against the bias cut portion 266 of the latch 252 forces the latch to pivot about point 254 against the force of the spring 258 and the weight of the piston to release the shoulder 256 from engagement with the bototm of the weighted piston 210. The weighted piston thereupon falls under the influence of gravity within the chamber.

Concurrently, the second arm 278 of the bimetallic thermostatic strip 274, extending in the opposite direction from the fixed post 282 as the arm 276, and having a button 304 at its opposite end, moves upwardly. This forces the switch contacts 302 back over center to snap the contacts apart and disconnect the heater circuit. The heater circuit is then ready to be reenergized for subsequent operation of the apparatus.

The parameters of operation of the apparatus 200 are similar to those of operation of the apparatus 10 shown in FIG. 1. A substantially constant pressure is created by the falling weighted piston 210. The rate of flow of the liquid through the material to be infused 208 takes approximately three minutes and is controlled by the restricted outlet 212 in the apparatus of FIG. 10. The liquid is dispensed at the desired predetermined temperature as controlled by the thermostatic element 274.

FIGS. 9, 9a, 15, 16 and 17

The modification of the invention illustrated in these figures differs from the modifications shown in FIGS. 1 – 8 and FIGS. 10 – 14 in that the latching mechanism for holding the weight in the uppermost position is different and in the addition of a means for compensating the action of the temperature responsive switch for changes in ambient temperature. A variable orifice at the outlet of the infusion chamber has also been added.

Figure 15:
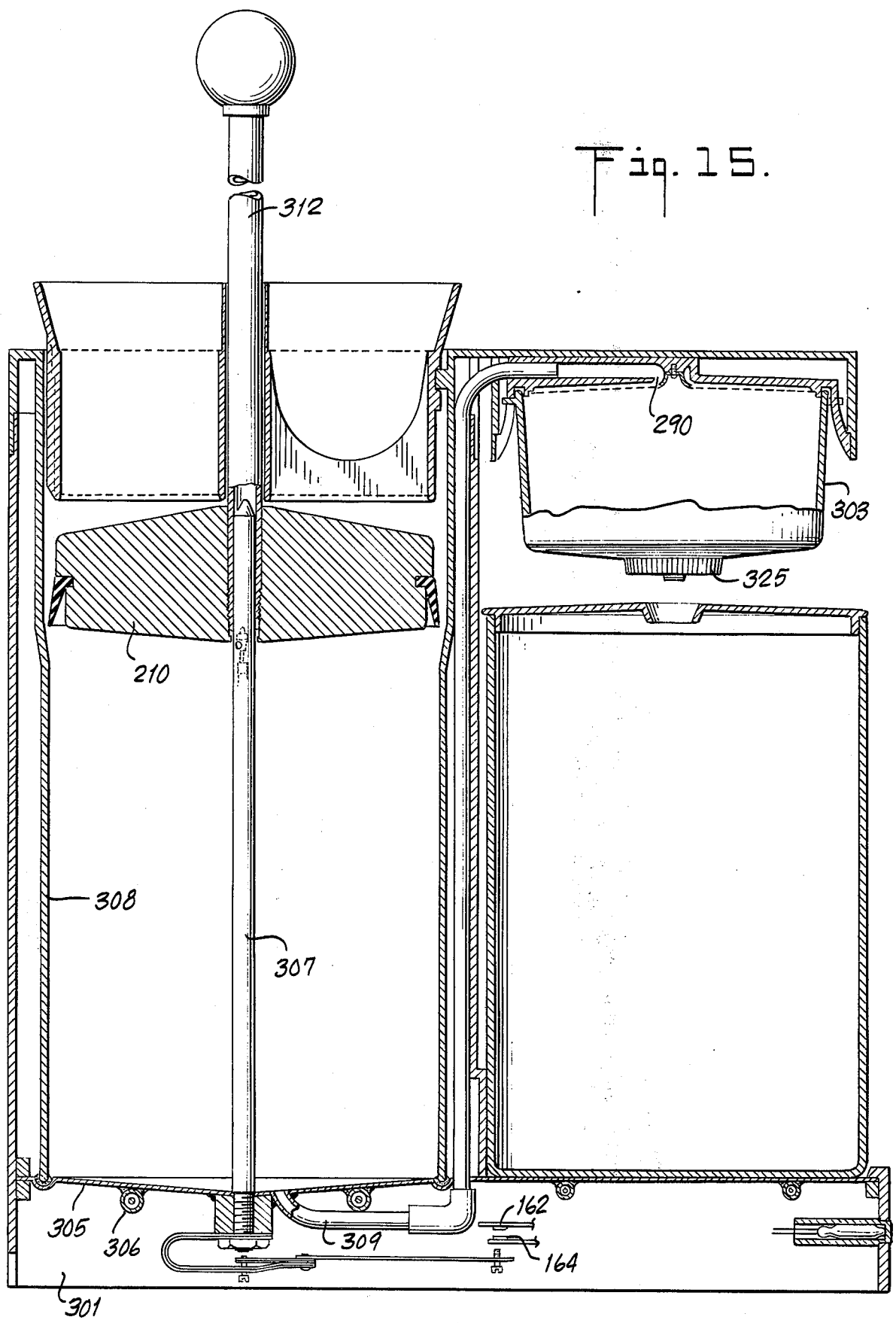
FIG. 15 is a cross-sectional elevational view of a third form of apparatus constructed in accordance with the invention.

Those elements in FIGS. 15 – 17 which correspond both in structure and function to their counterparts in FIG. 10 have been given the same reference numerals, and will not be further described.

The complete apparatus is best seen in the general view in FIG. 15. It comprises an outer casing 301 enclosing a heating chamber 308, and an infusion chamber 303. The bottom of the heating chamber 308 is connected through a conduit 309 to the top of the infusion chamber 303. The bottom of the heating chamber 308 is closed by a plate 305 having an electric heater coil 306 welded to its underside. The coil 306 may be energized by a circuit similar to that shown in FIG. 8 for the heating coil 32.

An inner sleeve 307 extends through an aperture at the center of the bottom plate 305. As best seen in FIG. 16, the sleeve 307 is provided with an external shoulder 307a which abuts against the top of the plate 305. An internally threaded tube 310 is welded, as shown at 311 to the underside of the plate 305. The tube 310 receives the externally threaded lower end of the sleeve 307. The upper end of the sleeve 307 is closed, as shown at 307b. An outer sleeve 312 is slidable on the inner sleeve 307. The outer sleeve 312 has an external thread adapted to engage an internal thread on the weight 210. The lower end of the sleeve 312 abuts against a hardened insert 256. The sleeve 307 is provided with three radially extending apertures 307a (see FIG. 17). The apertures 307a are tapered, with their larger diameter at their inner ends. The apertures 307a receive three balls 313 having a diameter smaller than the inner diameter of the tapered apertures 307a and larger than the outer diameter of those apertures.

A push rod 314 is movable vertically within the sleeve 307. Near its upper end, the push rod 314 carries a pair of O-ring seals 315. Above those seals, the push rod 314 is provided with a narrow neck portion 314a 314a above that a shoulder 314b of somewhat greater diameter. The upper end of the shoulder 314b terminates in a land 314c of substantially the same diameter as the major part of the push rod 314, so that it fits slidably within the sleeve 307.

A coil spring 316 is held in compression between the upper surface of the land 314c and the closed top 307b of the sleeve 307. The spring 316 biases the push rod 314 downwardly and thereby forces the shoulder 314b against the balls 313, pushing them into the apertures 307a, so that a small portion of each of the balls 313 projects outwardly beyond the outer surface of the sleeve 307. In that position, the balls 313 are in the path of downward movement of the insert 256 which is attached to the weight 210, so that the balls 313 effectively latch the weight 210 in its upper position.

One end of a U-shaped bimetallic strip 317 is held against the under surface of the tube 310 by means of a nut 320, which threadedly engages the lower end of the sleeve 307. The U-shaped bimetallic strip 317 is turned on its side, and has its upper arm clamped between the nut 320 and the tube 310 and its lower arm extending to the right as shown in FIGS. 15 and 16 to a point beyond the lower end of the push rod 314. At its end, the arm 317b is attached by a rivet 320 to a compensating bimetallic strip 322 and also to one end of a finger 323 which operates a button 304 for actuating the switch 302 of FIGS. 13 and 14.

The bottom plate 305 is in heat conductive relation with the heater 306 and is also in heat conducting contact with the tube 310. Consequently, there is a continuous metallic path for conducting heat from the heater coil 306 to the bimetallic strip 317a.

As the temperature of the strip 317 increases, it tends to move its arm 317b upwardly with respect to its fixed arm 317a. It is desired to have the push rod 314 move upwardly from the position shown to trip the latch whenever the temperature of the water being heated exceeds 195°F ± 5°. The bimetallic strip 317 may be readily constructed to have that characteristic.

The bimetallic strip 317 is located in a confined space under the chamber 308. consequently, the temperature in that chamber is considerably different when the apparatus is first actuated after having been cold for a considerable period of time, than is the case when the apparatus is repeatedly actuated in order to make two or more batches of coffee in quick succession. If some compensation is not provided, the water for the second batch of coffee would be heated for a considerably shorter time than the water for the first batch. The compensating bimetallic strip 322 is provided to introduce the necessary compensation. The left end of the bimetallic strip 322 carries an adjusting screw 324 whose upper end is brought into engagement with the lower end of the push rod 314 to drive the push rod upwardly and trip the latch. The strip 322 works in opposition to the strip 317, in other words, as the temperature adjacent the strips 317 and 322 increases, the free end of the strip 317 moves upwardly, but the free end of the strip 322 moves downwardly. Consequently, if the apparatus is started with the heater and its related elements already warm, the strip 317 will have carried the strip 322 upwardly and the strip 322 will have carried the screw 324 downwardly from the positions shown in the drawing, so that the same movement of the free end of the strip 317 pushes the rod 314 upwardly and trips the latch 313.

As the bimetallic strip 317 is heated and pushes upwardly on the rod 314, the motion of the rod is resisted by the spring 316, by the friction between the balls 313 and the shoulder 314b and by the friction between the rod 314 and the inner sleeve 307. Consequently, the bimetallic strip 317 becomes stressed by the effects of the upwardly acting force of the strip 317 itself and the opposing frictional load on the rod 314. This stress is retained in the strip 317 until the shoulder 314b passes the balls 313, whereupon those balls move in against the neck 314a, the frictional load on the rod 314 is substantially and suddenly reduced, and the rod 314 moves upwardly with a snap action. At this time the right hand end of finger 323 is also snapped upwardly by the bimetallic strip 317, so that button 304 actuates the switch 302 at the same time that the weight 210 descends in the heating chamber.

Figure 9:
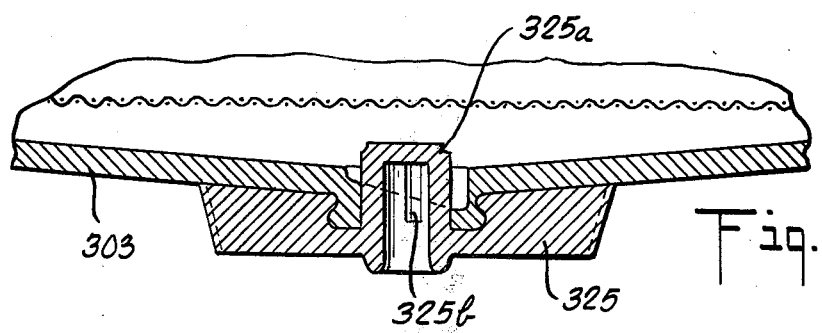
FIG. 9 is a fragmentary cross-sectional view taken along the line 9—9 of FIG. 15.
Figure 9A:
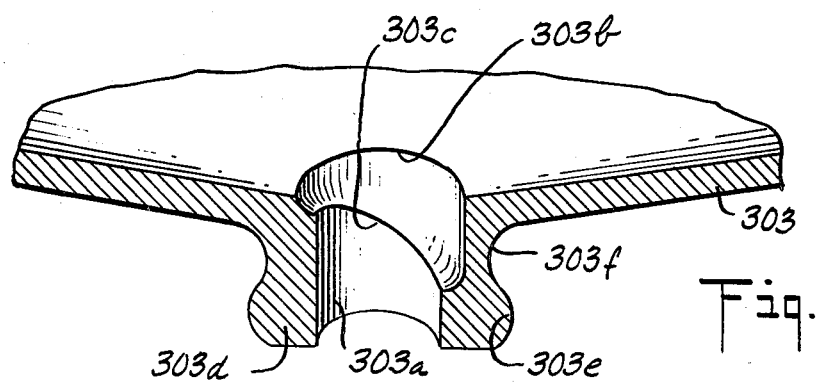
FIG. 9a is a view, partly in perspective and partly in section along the line 9—9 of FIG. 15, and with a certain part removed.

The outlet of the infusion chamber 303 is provided with a variable orifice, best seen in FIGS. 9 and 9a. The bottom of the chamber 303 is provided with a central outlet passage 303a. The upper end of the passage 303a is recessed as shown at 303b along a helical contour 303c. The outlet passage 303a is located in a projection 303d having a bead 303e adjacent its lower edge, and a neck 303f above that lower edge.

A manually operable valve member 325 includes a central cylindrical portion 325a which fits within the outlet passage 303a. The upper end of the portion 325a is closed, and its lower end is open, as may be seen in FIG. 9. The portion 325a is provided with a slot 325b in one of its lateral walls. The slot 325b cooperates with the recess 303b to restrict the outlet passage for the flow of coffee from the infusion chamber 303. By rotating the valve member 325, more or less of the slot 325b may be covered by the helical contour of the edge 303c, so as to vary the size of the orifice at the outlet from the infusion chamber 303. Consequently, by rotating the valve member 325, the area of the outlet orifice may be selected in accordance with the number of the cups of coffee desired. The object of this selection is to proportion the rate of flow to the number of cups required so that the infusion time will be the same regardless of the number of cups.

The valve member 325 and the projection 303d are of yieldable plastic material, so that the valve member may be assembled on or disassembled from the projection 303d simply by snapping it over the bead 303e.

A receptacle 326 rests on a plate 327 provided on the housing 301, under the outlet valve member 325. The plate 327 has a heater coil 328 attached to its under side, to maintain the temperature of the coffee discharged into the receptacle 326. The coil 328 may be provided with suitable controls (not shown).

What is claimed is:

1. Apparatus for dispensing a quantity of a heated liquid comprising:
    a. a chamber adapted to contain a liquid to be heated, said chamber including an upper portion, open at its top, and a narrower lower portion having an outlet at its bottom;
    b. means for heating the liquid in said chamber;
    c. a weight movable from an upper position within said upper portion and above the surface of the liquid to a lower position at the bottom of said chamber, said weight fitting closely within the lower portion and thereby as it descends closing the top of the lower portion and forcing the heated liquid under pressure through the outlet;
    d. latch means movable between a latching position in which it holds the weight in its upper position and a retracted position in which the weight is free to descend;
    e. means biasing said latch means toward its latching position;
    f. means responsive to the temperature of the heated liquid; and
    g. mechanical means operable by the temperature responsive means when the liquid has been heated to the predetermined temperature to move said latch to its retracted position against the force of said biasing means, thereby allowing the weight to descend to its lower posiition, and forcing the heated liquid through said outlet.

2. Apparatus as in claim 1, in which:
    a. said mechanical means includes:
        i. a first sleeve fixed centrally in an aperture in the bottom of said chamber and extending upwardly therefrom;
        ii. a second sleeve fixed centrally within said weight, said second sleeve being slidable on the exterior of the first sleeve; and
        iii. a push rod slidable within said first sleeve and extending below the lower end thereof;
    b. said latch means includes:
        i. a latch member movable radially in said first sleeve between a latching position in which it projects outwardly through an opening in said first sleeve and is effective to limit the downward movement of the second sleeve and a retracted position in which the latch member is located completely within the outer surface of the first sleeve and the second sleeve is free to descend;
        ii. spring means biasing the latch member to its latching position; and
    c. the upper end of said push rod acts against said spring means and is thereby effective to cause movement of the latch to its retracted position and allow the weight and the second sleeve to descend.

3. Apparatus as in claim 2, in which:
    a. said latch member is a lever pivotally mounted within a slot in said first sleeve;
    b. said spring means acts horizontally on the lever; and
    c. the upper end of said push rod and the lower end of the lever have cooperating cam surfaces effective to move the lower end of the lever towards its retracted position when the push rod is moved upwardly.

4. Apparatus as in claim 2, in which:
    a. said latch member comprises at least one ball captured within an aperture in the first sleeve and movable therein;
    b. said spring acts downwardly on the push rod; and
    c. said push rod has a cam surface which allows the ball to move inwardly under the force of the weight when the push rod is moved upwardly by the temperature responsive means.

5. Apparatus as in claim 1, in which said temperature responsive means comprises:
    a. a first bimetallic strip having one end in heat conductive relation with said heating means; and
    b. a second bimetallic strip fixed on the opposite end of the first bimetallic strip and having its opposite end immediately under the push rod, said second bimetallic strip acting in the opposite sense to said first strip and being effective to compensate the action of the first bimetallic strip for variations in the ambient temperature.

* * * * *